(12) United States Patent
Fuisz et al.

(10) Patent No.: US 7,039,722 B1
(45) Date of Patent: May 2, 2006

(54) METHOD AND APPARATUS FOR TRANSLATING WEB ADDRESSES AND USING NUMERICALLY ENTERED WEB ADDRESSES

(76) Inventors: Richard C. Fuisz, 128 Ballantrae Farm Dr., McLean, VA (US) 22101; Joseph M. Fuisz, 1200 N. Veitech St., Apt. 600, Arlington, VA (US) 22201

( * ) Notice: Subject to any disclaimer, the term of this patent is extended or adjusted under 35 U.S.C. 154(b) by 534 days.

(21) Appl. No.: 09/709,645

(22) Filed: Nov. 13, 2000

Related U.S. Application Data (60) Provisional application No. 60/165,370, filed on Nov. 12, 1999, provisional application No. 60/174,684, filed on Jan. 6, 2000.

(51) Int. Cl.
*G06F 15/16* (2006.01)
(52) U.S. Cl. ............................ 709/246; 704/7; 715/513
(58) Field of Classification Search ................ 709/245, 709/246, 219; 704/2, 7; 715/513, 531, 540
See application file for complete search history.

(56) References Cited

U.S. PATENT DOCUMENTS

| | | | |
|---|---|---|---|
| 5,764,910 A | 6/1998 | Shachar | |
| 5,956,490 A | 9/1999 | Buchholz et al. | |
| 5,974,453 A * | 10/1999 | Andersen et al. | 709/220 |
| 6,061,738 A | 5/2000 | Osaku et al. | |
| 6,119,078 A * | 9/2000 | Kobayakawa et al. | 704/3 |
| 6,181,326 B1 * | 1/2001 | Takahashi | 345/158 |
| 6,286,053 B1 * | 9/2001 | Van Peursem et al. | 709/247 |
| 6,466,570 B1 * | 10/2002 | Low et al. | 370/352 |
| 6,519,626 B1 * | 2/2003 | Soderberg et al. | 709/203 |
| 6,564,254 B1 * | 5/2003 | Shoji et al. | 709/217 |
| 6,594,254 B1 * | 7/2003 | Kelly | 370/352 |
| 6,615,237 B1 * | 9/2003 | Kyne et al. | 709/203 |
| 6,654,741 B1 * | 11/2003 | Cohen et al. | 707/6 |
| 6,738,827 B1 * | 5/2004 | Abir | 709/245 |
| 2002/0042736 A1 * | 4/2002 | Wang et al. | 705/10 |

OTHER PUBLICATIONS 1-800-FLOWERS Web Page, 1996, from http://web.archive.org/web/19961225213825/http://www.1800flowers.com/, 1 page.*
Balkin, "AltaVista's Automatic Translation Program," Database. Weston., May 1999, vol. 22, Iss. 2, pp. 56ff.*
Printout of USPTO Website using Babelfish's Translation Program from English to French, from http://babelfish.altavista.com, pp. 1-3 and corresponding source code.*

* cited by examiner

*Primary Examiner*—Bradley Edelman (57) ABSTRACT

Use of existing Internet-based communications protocols and standards are used to implement a translation module that converts a scheme-specific name entered by a user into a Web browser into a second scheme-specific name either prior to or during transmission.

18 Claims, 7 Drawing Sheets

METHOD AND APPARATUS FOR TRANSLATING WEB ADDRESSES AND USING NUMERICALLY ENTERED WEB ADDRESSES

RELATED APPLICATIONS

The present application claims the benefit of the following provisional patent applications, which are both hereby incorporated by reference in their entirety: U.S. Application Ser. No. 60/165,370 and Application Ser. No. 60/174,684 both entitled METHOD AND APPARATUS FOR TRANSLATING WEB ADDRESSES AND USING NUMERICALLY ENTERED WEB ADDRESSES, filed on Nov. 12, 1999 and Jan. 6, 2000, respectively, both by Richard C. Fuisz and Joseph Fuisz.

FIELD OF THE INVENTION

The present invention relates to the Internet and Internet browsers and provides a new naming scheme that permits effective use of all scheme-specific names and assists in the effective use of existing scheme-specific names on limited keyboard devices, such as number pads on phones.

BACKGROUND OF THE INVENTION

The Internet, and more particularly the world-wide-web, as it is know today was reportedly first created by Timothy Berners-Lee at the European Laboratory for Particle Physics. It is there, where in 1989, that he developed a precursor to the Mosaic browser and set forth the protocols and software that present distributed information in a hypertext format.

The new hypertext format permitted documents to reference other documents using links. The links permitted users to navigate through non-sequential information. The hypertext format was well-received by the general population, in part, because it simplified using the Internet by no longer requiring that the users know arcane command-line protocols, such as File Transfer Protocol (FTP).

The world-wide web, or simply the Web, was designed to consolidate many different types of information. Thus, the Web uses existing protocols such as Multipurpose Mail Extensions (MIME) and Transmission Control Protocol/Internet Protocol (TCP/IP) to transfer data. To integrate this disparate data the Web uses a combination of Uniform Resource Locators (URLs), the Hypertext Transfer Protocol (HTTP), the Hypertext Markup Language (HTML) and the Common Gateway Interface (CGI) in its operation.

People commonly think of the web based on URLs. A URL is a filename that includes a server name. The URL can also include user name information in alphanumeric form and protocol-specific arguments and options. A URL can be broken down into the following parts:

<scheme>:<scheme-specific name> where the <scheme> is the communications protocol or scheme being used (e.g., HTTP). The <scheme-specific name> varies in format depending on the scheme, but is commonly a word or trade name. For example, a URL for a corporation may read:

http://www.affinitypartners.com/rxdrugstores/help.html

The "http" denotes use of the HTTP protocol. The "www.affinitypartners.com" is the URL name of the server that houses the corporate information. The "/rxdrugstores/help.html" refers to a particular subdirectory and filename located on (physically or logically) the server. As the HTTP protocol has become the Web's default standard, most web browsers will assume that the HTTP protocol is being used unless an alternative protocol is explicitly specified. One of the versions of HTTP is version 1.1., which supports all major browsers and web servers. A full description of HTTP is provided in IETF's RFC 2068.

In general, only alphanumeric characters are used in URL addresses. Characters that have been reserved for other purposes or are unsafe to use directly include the following:
Reserved:
; / ? @=&
Unsafe:
< >A # % { } | \ ^ { } '

If unsafe or reserved characters are used in a URL, URL encoding is generally performed. URL encoding typically comprises the replacement of the offending character with a new three-character symbol that comprises the "%" sign followed by the hexadecimal digits that represent the offending character.

Regardless of the HTTP version being used, whether it is 1.1 or later, there is an inherent limitation on the number of usable scheme-specific names. The limitation on usable characters combined with the limited number of names that are easily remembered by the user has placed an artificial limitation on expansion of the Web.

The present invention recognizes this limitation and proposes a solution that is simple and easily implemented, that permits the use of all possible scheme-specific name combinations.

SUMMARY OF THE INVENTION

The present invention recognizes that the Web is premised on ease-of-use, but that the limitation on the number of easily recognized and remembered names is limited and results in the needless complication of use of the Web. For example, most basic names that are used for a particular scheme-specific name use, such as "books.com" and "drugs.com", have already been reserved for use. As there are only a limited number of usable names, the full use of the Web's capabilities will likely not be realized under the current system.

To make matters worse, domain-name "squatters" have begun to register names of companies that have been slow to reserve their scheme-specific name. This has resulted in anti-squatter legislation and needless confusion.

In addition, individuals with disabilities have been left behind. The extensive use of visual and audio data in the Web makes it especially challenging for individuals with physical handicaps to navigate the Web. The current system does not permit a user to access a Web page, for example heard on a television commercial, without a special, blind-friendly address being given as well.

Further compounding the problem is that the Web is a national and international medium that does not recognize boundaries traditionally established in trademark law. Thus, companies who have a right to use a name for local commerce have begun to run afoul of like-named groups that have operated in a different geographical region.

Thus, the present invention uses the existing protocols and standards and implements a translation module, that at its very basic level, converts a scheme-specific name entered into a Web browser by a user, into a second scheme-specific name either prior to sending or during transmission. The translation can be transparent to the user to preserve the Web's ease of use philosophy. This also permits individuals with disabilities to access disability-friendly Web pages using the same basic address as non-disabled individuals.

A web browser is equipped with a translation module. Alternatively, a router or proxy server may be equipped with the translation module or the user's keyboard can be equipped with a translation modules activation button. The translation module provides the user with new layers of the Web, which may be identified by color, keyword, name or any other suitable means.

If, for example, a translation identifier is used to identify layers of the Web, a user may enter ww2.affinitypartners.com. Alternatively, if the user's keyboard is so equipped, multiple "www" buttons may be provided that are differentiated by color, name, alphanumeric, numbers, language or other differentiating factor (e.g., alternate Web pages that are accessible by the disabled). The user may select the Web layer being accessed by selecting the appropriate button. Thus, the user may select a "green" layer in which the green "www" button is selected on the user's computer.

Once the web address has been entered, the translation module translates the Web address. In this example, the system recognizes an address is a translated address through the use of the "ww2" layer identifier. The translation module then applies a translation formula to the scheme-specific name based on the layer identifier used. The translation modules applies a translation formula to the scheme-specific name that has been entered by the user to convert it into another scheme-specific name that corresponds to a valid Web address that may not otherwise by used because of its inherently complex nature.

A translation formula may include the appending of a string of characters to the inputted address, such that all "ww2" addresses or green "www" addresses end in a predetermined string of alphanumerics or numbers, such as "123456789". An example of the translation formula may be:

$$\text{<scheme-specific name>}_{OUT} = \text{<scheme-specific name>}_{IN} + N_{LAYER}$$

where $N_{LAYER}$ is a predetermined string of characters. Thus, by varying N, the number of usable names that are easily recognized and remembered by the user may be expanded.

Thus, in our example above, the "ww2.affintiypartners.com" request is first recognized as a translated web address because of the "ww2" and is then translated into www.affinitypartners123456789.com, where N is "123456789". Thus, permitting multiple companies to have easily recognizable web addresses.

By shielding the user from complicated names, the present invention permits the use of complicated scheme-specific names while retaining the ease of use that has made the Web popular.

The present invention is very useful for individuals with disabilities. For example, a company may establish an alternate site for blind users. The blind users do not need to learn a unique set of Web addresses to access these specially designed sites. Rather, the blind users may use the same address as the corresponding non-special site, but may simply enter a translation identifier to access the specially designed site. It is expressly contemplated that multiple sites may also be established based on language, thus permitting a company to advertise a single brand identity but have multiple web pages on different layers (different translation modules) for each language.

It is expressly contemplated that the present invention may be implemented on a variety of hardware and software configurations including on an operating system, on a browser, on a network, or on a router. It is also expressly contemplated that multiple translation formulas may be used including forward translation formulas that add characters or reverse translation formulas that remove characters.

Additional needs, advantages, and novel features of the present invention will be set forth in the description that follows, and in part, will become apparent upon examination or may be learned by practice of the invention. The features and advantages of the invention may be realized and obtained by means of the instrumentalities and combinations particularly pointed out in the appended claims.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method and system for translating web addresses are described herein. In the following description, for purposes of explanation, numerous specific details are set forth in order to provide a thorough understanding of the present invention. It will be apparent, however, to one of ordinary skill in the art that the present invention may be practiced without these specific details. In other instances, well-known structures and devices are shown in block diagram form in order to avoid unnecessarily obscuring the present invention.

Figure 1:
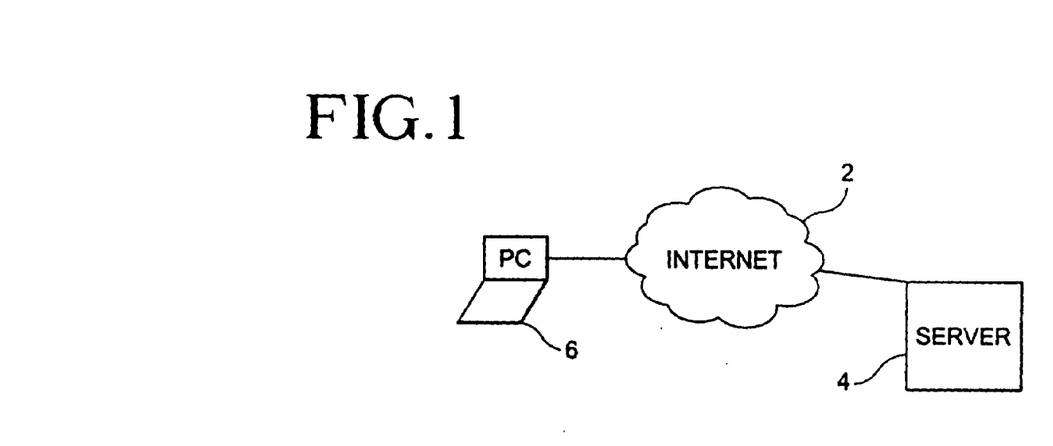
FIG. 1 is a schematic of one embodiment where the translation module is implemented on the originating computer.

As those of ordinary skill will recognize and appreciate, the present invention may be implemented in software form or in a hard-wired embodiment. The software implementation is designed to operate in conjunction with any standard Web browser and may be implemented as a plug-in module. The hardware necessary to implement the present invention may vary considerably. For example, in FIG. 1, a personal computer 6 is connected to the Internet 2 that, in turn is connected to a destination server 4. The translation module may be implemented on the personal computer 6 prior to the processing of the desired Web address.

Figure 2:
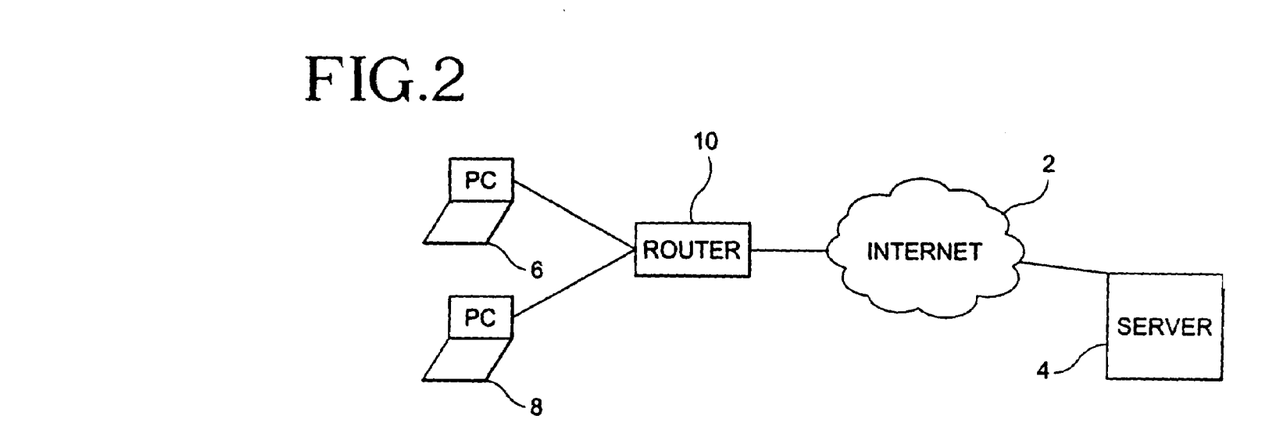
FIG. 2 is a schematic of another embodiment where the translation module is implemented on a router or proxy server.

In FIG. 2, a first personal computer 6 and second personal computer 8 are connected to a proxy server or router 10, which is, in turn, connected to the internet 2 and a destination server 4. The translation module may be implemented on either or both personal computers 6 and 8 or on the proxy server or router 10.

Those of ordinary skill in the art will appreciate that the destination server is being shown to figuratively show a destination that has an IP address that the user would like to access. The actual existence of the destination server 4 is not a material part of the present invention and it is expressly contemplated that the present invention may be used with Web addresses that are assigned, or are yet to be assigned, and have no designated server or location.

The present invention works in part by identifying the existence of a translated Web address. In that regard, as shown if FIG. 3, a personal computer 12 may be provided with a special keyboard 14. The keyboard 14 may be provided with designated keys or buttons 16 and 18 that may correspond to different translations or layers. For example, button 16 may correspond to a traditional "www" request and button 18 may correspond to a translated "2ww". Those of ordinary skill in the art will recognize that the keyboard 14 may be provided with one or more keys that function similarly to buttons 16 and 18.

Figure 4:
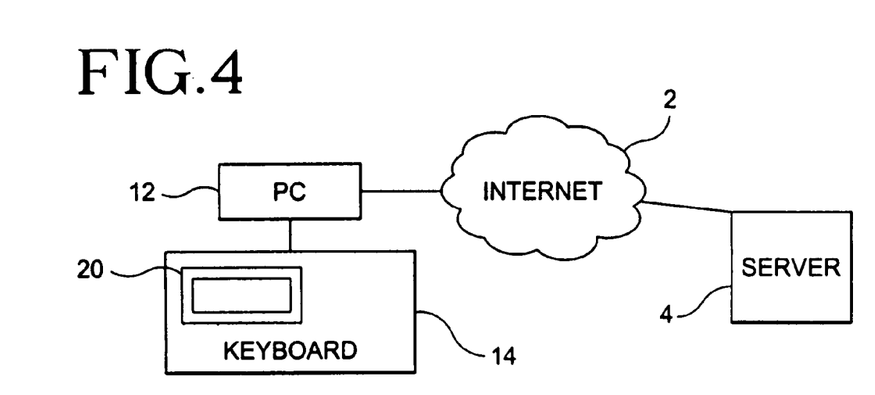
FIG. 4 is a schematic of an embodiment that uses a template to create translation keys on a standard keyboard.

As shown in FIG. 4, the present invention is also designed for use on a standard personal computer 12 with a conventional keyboard 14. A translation template 20 may be provided that is used by the translation module to identify a translated request. For example, the translation template may designate the "1" key as a translated request. Thus, the user would enter a "1.books.com" which would be identified by the translation module as a level 1 translation and proceed accordingly.

It is expressly contemplated that the various levels of translation may be designated by either a string of characters or as variations of "www". For example, colors may be used to distinguish between a green "www" and a blue "www"; or the "www" may be changed such as "ww1", "ww2", "ww1a", "1ww", "weng", "wspa", etc. The identifiers are not limited to the "www" notation as the translation module can replace the translation identifier prior to processing. Variations of "www" have been used herein, only as an example, as it has become a familiar symbol to those accessing the Web. With regards to different colors, each color, can represent a different translation and hence a different layer within the Web.

The translation module works by converting an address request into an address that would not have other wise been used. The number of possible domain addresses can be defined as C. The number of usable scheme-specific names can be defined as W, where W approximates the number of words or phrases that are easily recognizable by the user. Recognizable words may be found in a dictionary and may comprises small sets of words that may be strung together. The remainder, R, is referred to as traditionally unusable names and may be defined as R=C−W, which include those addresses which are legitimate combinations of usable characters but do not fall within the usable set of recognizable names, R. Once all the usable addresses, W, are assigned, the addresses available for normal use are gone and future addresses that fall within the usable set, W, are no longer available. Thus, the present invention uses a translation module to apply a translation formula F to an inputted address and creates multiple domains of usable addresses, W. The user is shielded from the complex nature of the ultimate name through the use of the translation module. Thus:

$$W_1 = F_1(W)$$

$$W_2 = F_2(W)$$

$$W_N = F_N(W)$$

where N equals the number of possible translation formulas, F.

Figure 5:
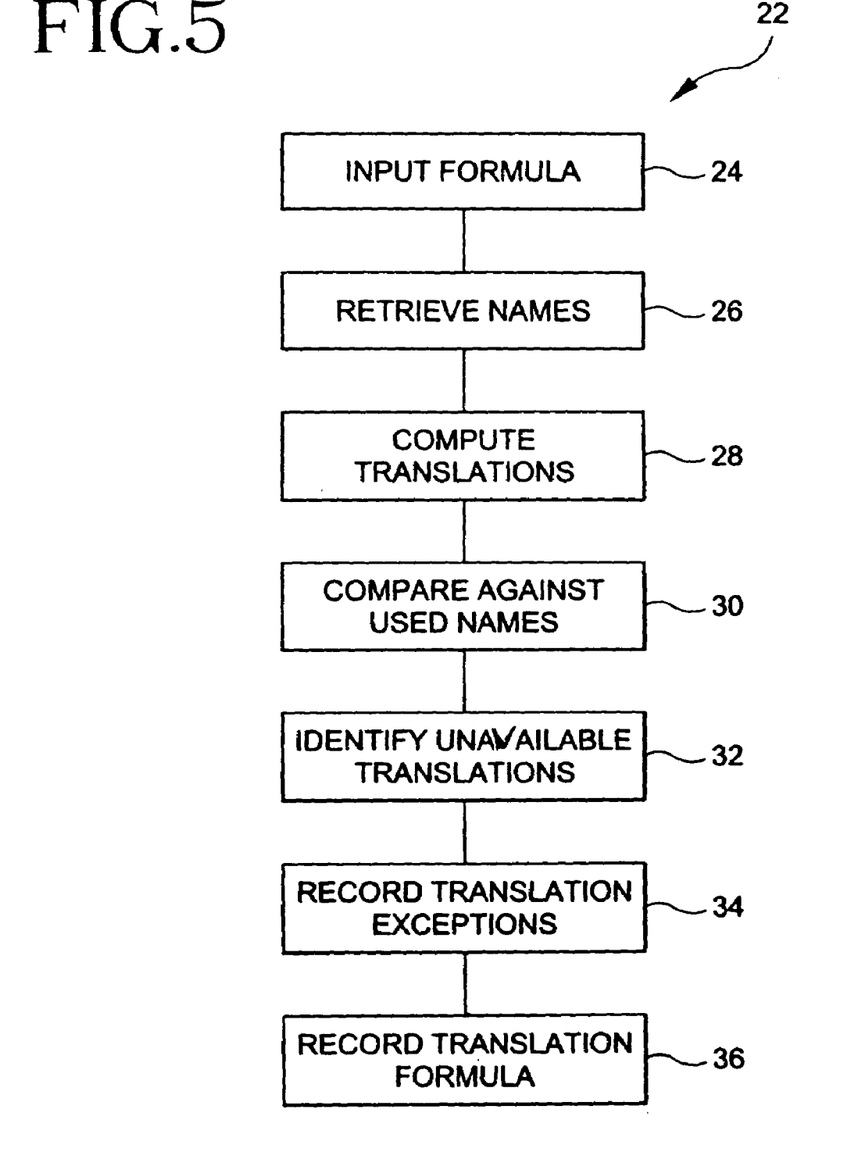
FIG. 5 illustrates an exemplary process for checking translation formulas.

Translation formulas F may be selected in a number of ways. One example of a translation formula checking module 22 that may be implemented on a personal computer with access to the availability of domain names is shown if FIG. 5. A translation formula is input (step 24) and a list of usable domain names is retrieved (step 26). The list of usable domain names may be taken directly from the domain names at use at the time of checking, it may be taken from a word list, a dictionary or any combination thereof. The list of usable domain names may correspond to W or may be over or under inclusive. The translation formula is then applied to the usable domain names (step 28) and the output is checked against the usable domain names (step 30). If the output of the translation formula does not result in a new available domain name, the unavailable translated addresses are identified (step 32). The number of untranslatable names is recorded (step 34) along with the translation formula (step 36). The process may be repeated with numerous translation formulas that have either no untranslatable name or those translation formulas that have the lowest number of untranslatable names.

Alternatively, translation formulas may be derived by simply checking registered domain names for available prefixes and suffixes that may be added to addresses to create new domains.

Translation formulas preferably comprise a single translation instruction, but may comprises numerous translation formulas and rules. For example, translation formulas may include the following:

$$F = W + Z \text{ or}$$

$$F = Z + W$$

where Z is a predetermined set of characters, such as "123456789". The operation (W+Z) adds the string of characters to the address. Thus, if W=affinitypartners and

Z=123456789 then W+Z would produce affintiypartners123456789

Likewise, Z+W adds the predetermined set of characters to the beginning of the domain name.

The present invention is not limited to the translation set forth above and may use any translation formula that the user deems has a suitable number of available domain names. For example, other translation formulas may include the interleaving of a predetermined set of characters into a name resulting in a translated address such as:

$$F = \Sigma W \Sigma Z$$

to produce a1f2f3i4n5i6t7y8p9artners

In addition, a translation can be used that acts on the individual characters. Those of ordinary skill in the art will recognize that a host of well know cryptographic techniques may be used to create altered names. It is also expressly contemplated, that individual characters can be deleted or grouped so as to create a translated domain name containing less characters than that originally presented. This is referred to as a reduction translation formula. One example of a reduction translation formula is the removal of vowels from a name, with or without replacing them, such a transforming "affinitypartners" into "ffntprtnrs" or "_ff_$n_{13}$ t_p_rtn_rs".

Figure 9A:
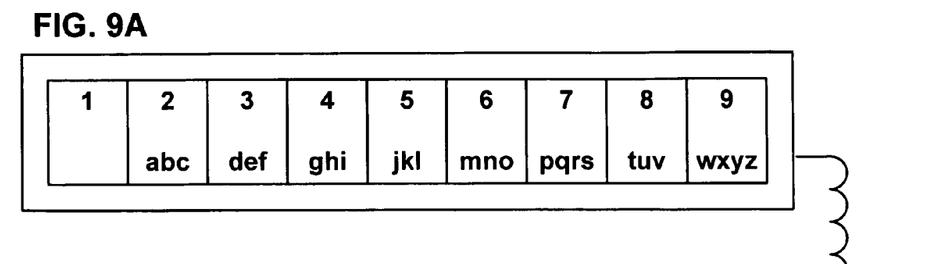
FIGS. 9A–9C show custom designed keyboards for use with the present invention.
Figure 9B:
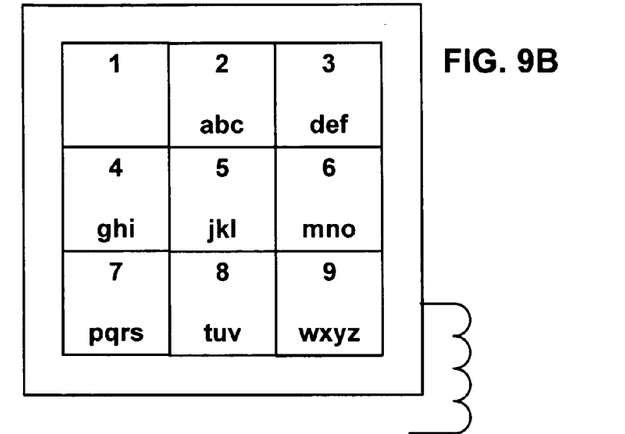
Figure 9C:
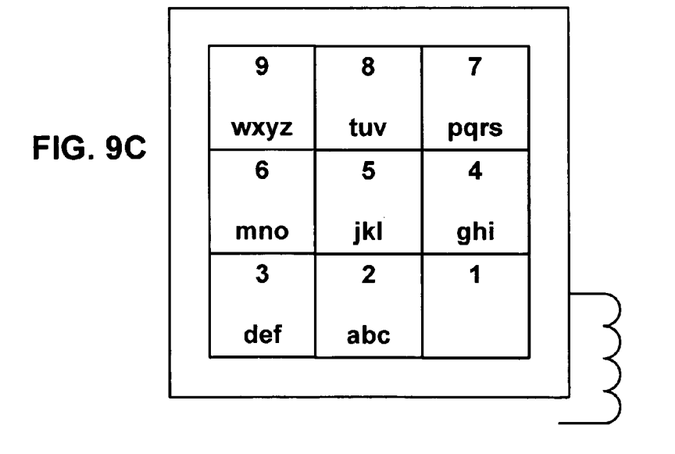

In addition, individual characters may be grouped and replaced by common characters. For example, a telephone template may be used to translate an address. Alternatively, a custom designed computer keyboard as shown in FIGS. 9A–9C may be utilized. The keyboard may be used in conjunction with a conventional keyboard or may be used separately for Internet purposes.

It is expressly contemplated that the translation formula may work in reverse, that is, to convert a pre-translated type address into a conventional address. Thus, a translation formula may be used that receives a Web address as an input of numbers and converts the numbers to a readable, well-known name, that defines the Web address. For example, a numerical input of:

999*2334648972786377*266 will be recognized as a translated address based on the "999" prefix. The remainder of the Web address may be converted, using a formula, by comparing the possible combination of valid Web addresses to the character combinations that may correspond to each of the numbers that are entered; thus arriving at:

www.affinitypartners.com

Additional layers of translations may be applied. Thus, after converting the numerical entry to "affinitypartners.com" a further translation may then be applied to the address.

It is expressly contemplated that a translation formula may comprises multiple formulas that are selectively used. Thus, a translation formula that has an exception may have an exception rule that applies a second translation formula, perhaps a reduction translation, when certain addresses are entered.

Figure 3:
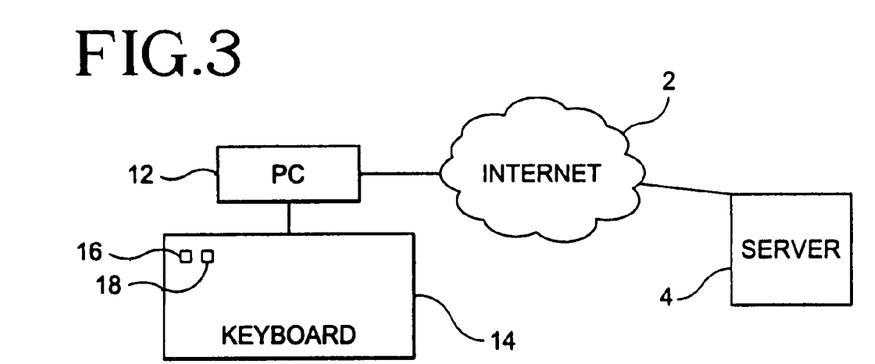
FIG. 3 is a schematic of an embodiment that uses dedicated translation keys.

In order for the translation formula to be implemented by the PC, browser or router, it is expressly contemplated that there is some form of translation identifier that will be used. As shown in FIG. 3, the translation identifier may comprise a dedicated button that provides an input to the translation program. Use of a dedicated input signal permits the user to continue to enter Web addresses in a conventional format. Alternately, an existing input, such as designated by the template 20, shown in FIG. 4, may be used. In yet another embodiment, a translation identifier is inserted into the Web address by the user.

The present invention may use a variety of translation identifiers. One example is to replace the "www" with a prefix such as "ww2" at which point the "ww2" input will trigger the translation module to translate the address into a "www" format.

In another embodiment, it is expressly contemplated that the translation identifier (trigger) comprises a geographical abbreviation, such as a state name. For example, "wca" or "wny" may be used to define translations that define addresses corresponding to geographical locations. This will assist trademark owners whose marks are geographically limited to obtain a Web address containing their name while combining its use with a geographic location. Thus, whereas under the present naming system, there may only be one "www.tonyspizza.com", under the present invention, multiple translation modules may be established so that there may be a "wca.tonyspizza.com" and a "wny.tonyspizza.com". The "wca" may be used to define a translation formula for addresses in the California layer and "wny" for addresses in the "wny" layer.

In another embodiment, it is expressly contemplated that the translation identifier (trigger) contains a reference to different language formats. For example, "wwwenglish" or "wwwspanish" may be used to define translations that define addresses corresponding to different languages.

In another embodiment, it is expressly contemplated that the translation identifier (trigger) contains a reference to different disabilities so as to access a Web page that is conducive for use by a person with such a disability. For example, "wwwsight" or ""wwwhearing" or "wwwlargeprint" may be used to define translations that define corresponding addresses that are specially designed for use by individuals who are, for example, blind, deaf, etc. The use of the translation identifier means that a special address does not need to be memorized by the physically challenged.

Figure 6:
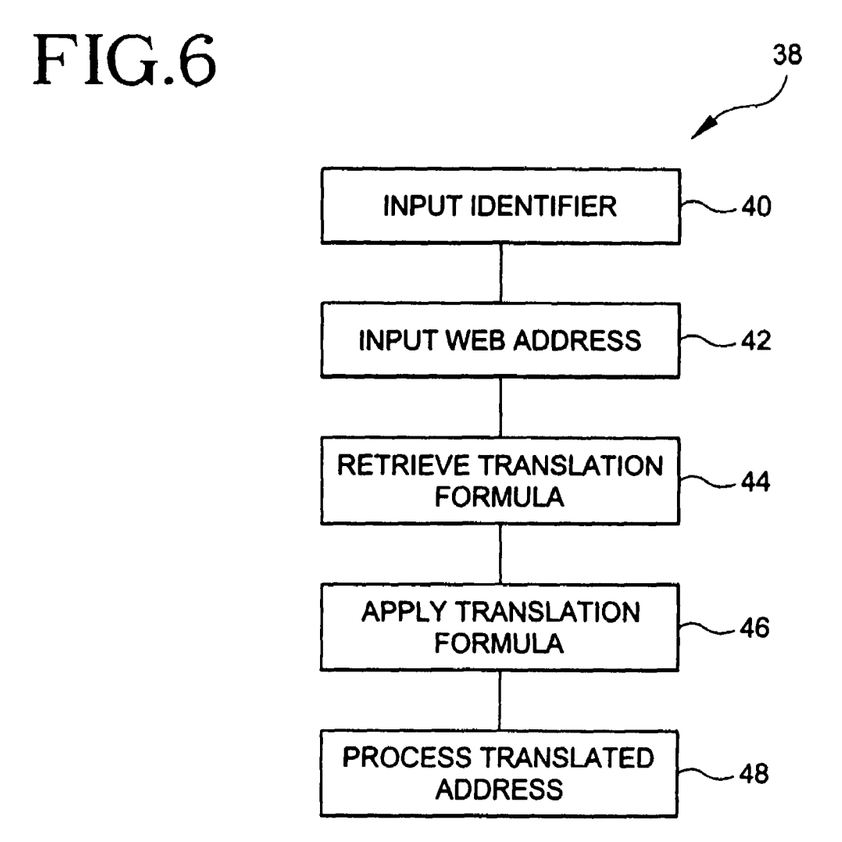
FIG. 6 illustrates an exemplary process for processing Web addresses with a separate translation identifier input.

A translation module 38 as shown in FIG. 6 may be used in conjunction with a Web browser that has dedicated translation button, like that shown in FIG. 3. Thus, the user pushed the dedicated button for the desired translation and in doing so inputs a translation identifier (step 40). For example purposes only, the translation identifier is a button labeled "www" that is colored green. The web address is then input (step 42). For example purposes only, the Web address input is "www.tonyspizza.com". Based on the translation identifier, the module retrieves the appropriate translation formula (step 44) and applies it (step 46). For example purposes only, the green "www" layer appends the term "green123" to all addresses. The resulting translated address is, thus, www.tonyspizzagreen123.com". This translated address is then processed like a conventional Web address (step 48).

Figure 7:
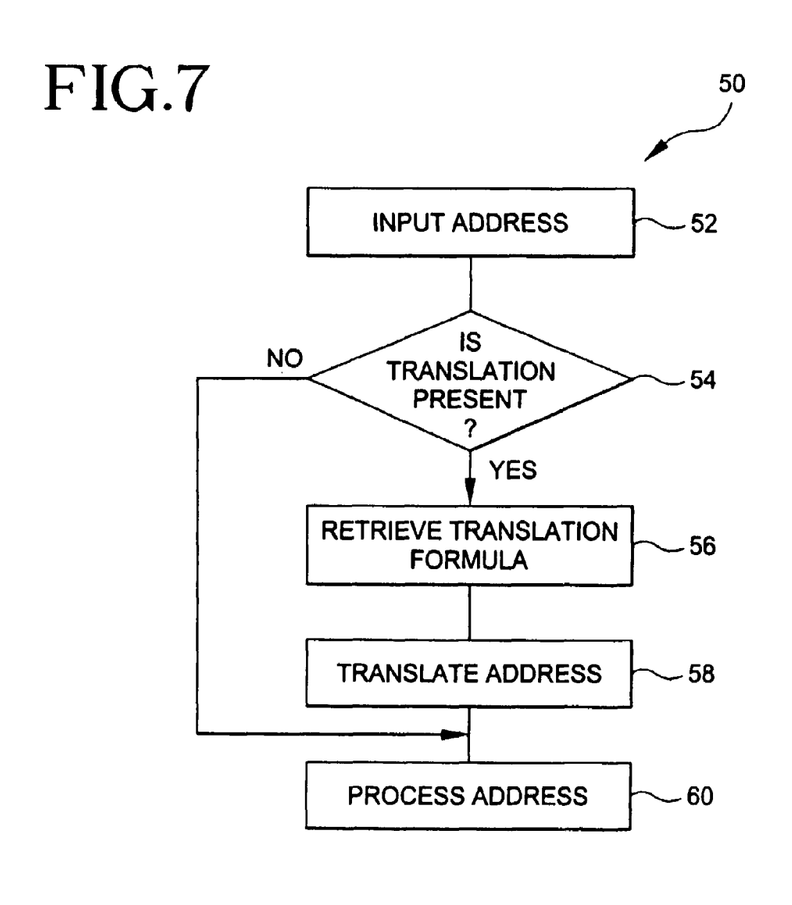
FIG. 7 illustrates an exemplary process for processing Web addresses with an embedded translation buffer.

In another embodiment, a translation module 50 receives a Web address (step 52) and then queries the address to determine if a translation identifier is present (step 54). If no translation identifier is present, the Web address is processed like a conventional address step 60). If, however, a translation identifier is present, then the associated translation formula is retrieved (step 56) and the address is translated (step 58). The translated address is then processed like a conventional address.

An alternate embodiment, not illustrated, sends the inputted address and the translation identifier, if provided separately, to a default Web address for subsequent processing. In this embodiment, the translation module performs the translations at a designated server or router.

The present invention also has particular applicability to Web browsers that are limited to numerical entries, such as PCS phones. In a numerical entry system, such as a key pad on a phone, or a keyboard as shown in FIGS. 9A–9C, each number is associated with multiple letters. For example, 2=a, b, or c 3=d, e, or f 4=g, h, or i Entering existing Web addresses in a purely numeric fashion is impractical because some numerical entries will result in more than one possible valid address. Thus entering 999*364*267 may result in valid matches for "www.dog.com" and "www.eng.com". Both converted addresses may be valid but only one may be assigned a numeric entry. Thus, a translation module may be used that creates numerous layers and assigns duplicate numeric entries to different layers.

Figure 8:
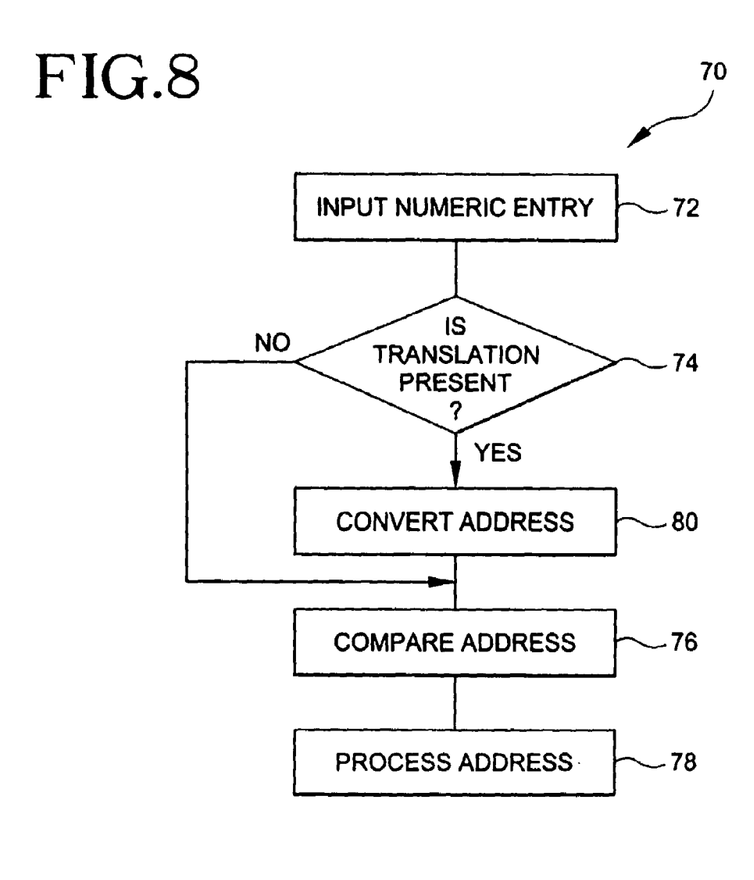
FIG. 8 illustrates an exemplary process for processing an alphanumeric Web address entered from a numerical keypad.

An example of a PCS or Web phone implementation 70 is shown in FIG. 8. A numeric entry is received (step 72) and is checked for a translation identifier (step 74). If no translation identifier is present, the numeric entry is compared to a database of converted names for the corresponding alphanumeric name (step 76). The converted alphanumeric name is then processed (step 78).

If a translation identifier is present, the numeric entry is compared to a database and converted to an alphanumeric name (step 80) that corresponds to the translation layer. The translation formula may comprise individual rules for each type of input or it may comprise a translation formula that is not scheme-specific name dependent. The converted name is then processed (step 78).

It is expressly contemplated that the processing of the alphanumeric name may be as a conventional Web request or that it may by modified to correspond to the capabilities of the PCS.

Thus, if the above numeric entries are used for example purposes only, "www.dog.com" may be assigned to the "www" layer and the "www.eng.com" may be assigned to the "ww2" layer (i.e., the 9-9-2 layer). The PCS that receives a 999*364*266 entry will recognize the lack of a translation identifier and send a request for "www.dog.com". A PCS that receives a 992*364*266 will recognize the translation identifier "992" and send a request for "www.eng.com" In this example, the translation formula may comprise individual rules for each type of numeric entry that is susceptible to a multiple address problem.

The present invention is not limited to PCS phones that are equipped with mini-Web browsers. As audio data, such as from Real Audio and other sources, is available at Web sites, PCS phones may be provided with Web access for the purpose of receiving audio information at a Web site. Accessing purely audio-based Web pages is also of use for blind users who wish to partake in the Web. Thus, the present invention is not limited to use with Web browsers, but may be used with any device that is designed to access the Web.

In a PCS or Web phone implementation, it is expressly contemplated that all or a portion of the translation module may be implemented at a base station, router or other remote location so as to limit the processing ability and data storage needed by the PCS.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims. The invention is capable of other and different embodiments and its several details are capable of modifications in various obvious respects, all without departing from the invention. Accordingly, the drawings and description are to be regarded as illustrative in nature, and not as restrictive.

What is claimed is:

1. A method of generating from a computer a request for a domain name, comprising the steps of:
   receiving on the computer a name associated with the domain name, said received name having a top-level domain portion and a sub-domain portion, both in a native language character set;
   selecting a translation formula;
   translating said received name with said translation formula to generate a scheme specific name by converting a sub-domain portion of said received name into a different sub-domain portion, said scheme specific name being in the native language character set; and
   generating, from the computer, a request for the domain name based upon said scheme specific name.

2. The method according to claim 1, further comprising the steps of:
   receiving a translation identifier; and
   selecting said translation formula based at least in part on said received translation identifier.

3. The method according to claim 2, wherein said translation identifier comprises a geographical identifier.

4. The method according to claim 2, further comprising the step of:
   analyzing said received name for a translation identifier.

5. The method according to claim 1, wherein said translation formula comprises at least one predetermined character and said step of translating said received name includes the step of:
   adding said at least one said predetermined character to said sub-domain portion of said received name.

6. The method according to claim 1, wherein said translation formula comprises a string of characters to add to said sub-domain portion of said received name.

7. The method according to claim 6, wherein the step of translating said received name includes the step of:
   adding said string of characters to said received name as a prefix.

8. The method according to claim 6, wherein the step of translating said received name includes the step of:
   adding said string of characters to said received name as a suffix.

9. The method according to claim 6, wherein the step of translating said received name includes the step of:
   interleaving said string of characters with said received name.

10. The method according to claim 1, wherein said translation formula removes at least one character from said sub-domain portion of said received name.

11. The method according to claim 1, wherein said translation formula converts said received name into a numeric entry.

12. The method according to claim 1, wherein said received name comprises a correctly formatted absolute uniform resource locator (URL).

13. A method of generating from a computer a web access request, comprising the steps of:
    receiving on the computer a numeric entry, the numeric entry comprising a first numeric portion corresponding to a top-level domain of a web address and a second numeric portion corresponding to a sub-domain portion of said web address;
    translating said numeric entry to an alphanumeric web address based at least in part on said first and second numeric portions; and
    generating, from the computer, a web access request to the alphanumeric web address.

14. The method according to claim 13, further comprising the steps of:
    receiving a translation identifier; and
    selecting a first translation formula based at least in part on said translation identifier.

15. The method according to claim 14, further comprising the steps of:

selecting a second translation formula based at least in part on said translation identifier; and applying said second translation formula to said alphanumeric web address to result in a scheme specific name.

16. The method according to claim 13, wherein said computer comprises a wireless device.

17. An apparatus for generating a request for a domain name, comprising:

a computer comprising an input device;

a browser operational installed on said computer; and a translation module configured to:

receive on the computer a correctly formatted absolute uniform resource locator (URL) associated with the domain name from said input device, the URL being in a native language character set;

select a translation formula;

translate said received URL with said translation formula to generate a scheme specific name by converting a sub-domain portion of said received URL into a different sub-domain portion, the different sub-domain portion being in the native language character set; and process said scheme specific name through said browser to generate a request for the domain name.

18. An apparatus for generating a web access request, comprising:

a wireless device comprising an input device;

a browser operationally installed on said wireless device; and a translation module configured to:

receive via the input device a numeric entry, the numeric entry comprising a first numeric portion corresponding to a top-level domain of a web address and a second numeric portion corresponding to a sub-domain portion of said web address;

translate said numeric entry to an alphanumeric web address based at least in part on said first and second numeric portions; and generate from the browser, a web access request to the alphanumeric web address.

* * * * *